Nov. 9, 1943.　　A. W. WEEMS　　2,333,965
MECHANICAL COTTON PICKER
Filed July 6, 1942　　3 Sheets-Sheet 3
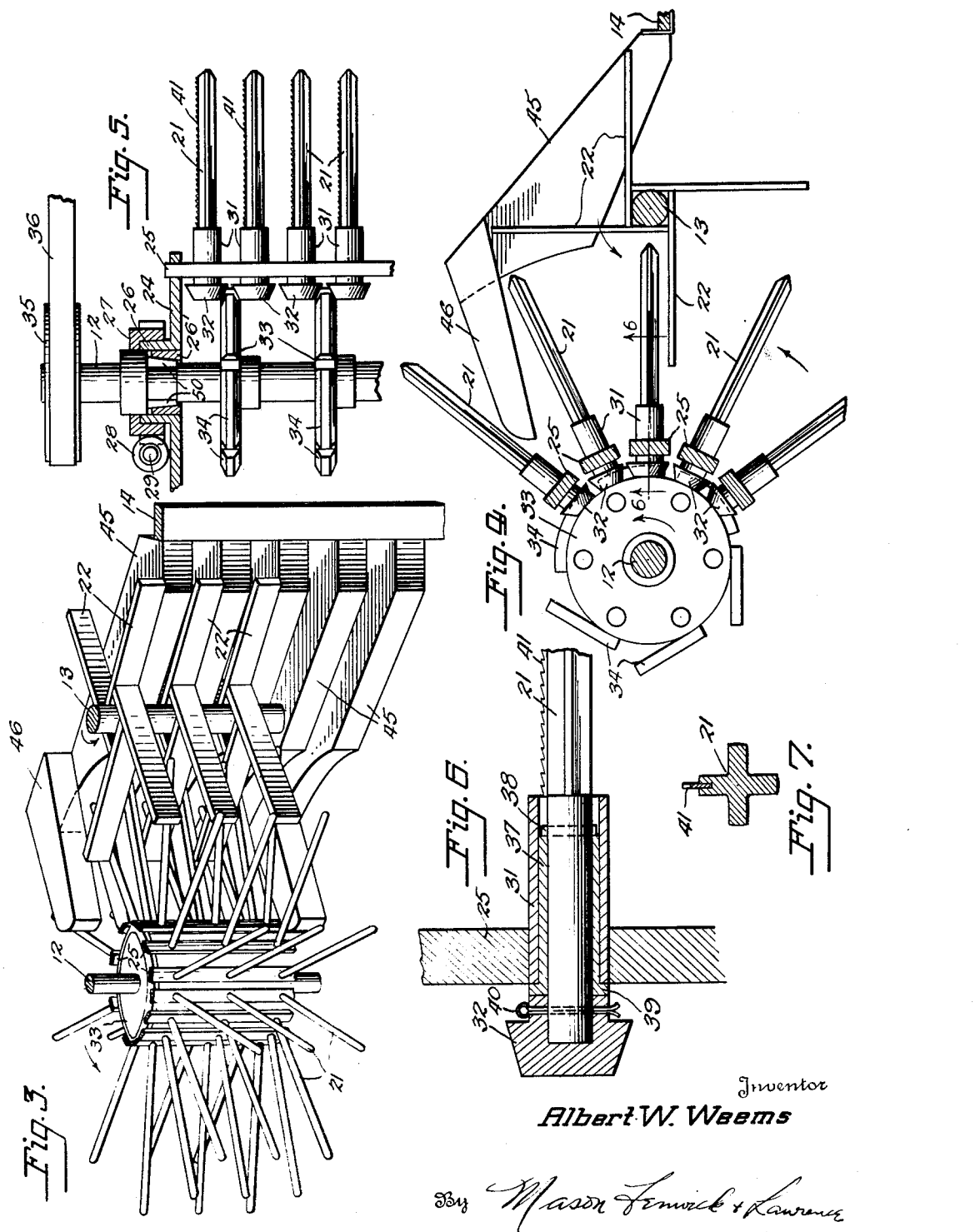
Inventor
Albert W. Weems
By Mason Fenwick & Lawrence
Attorneys Patented Nov. 9, 1943

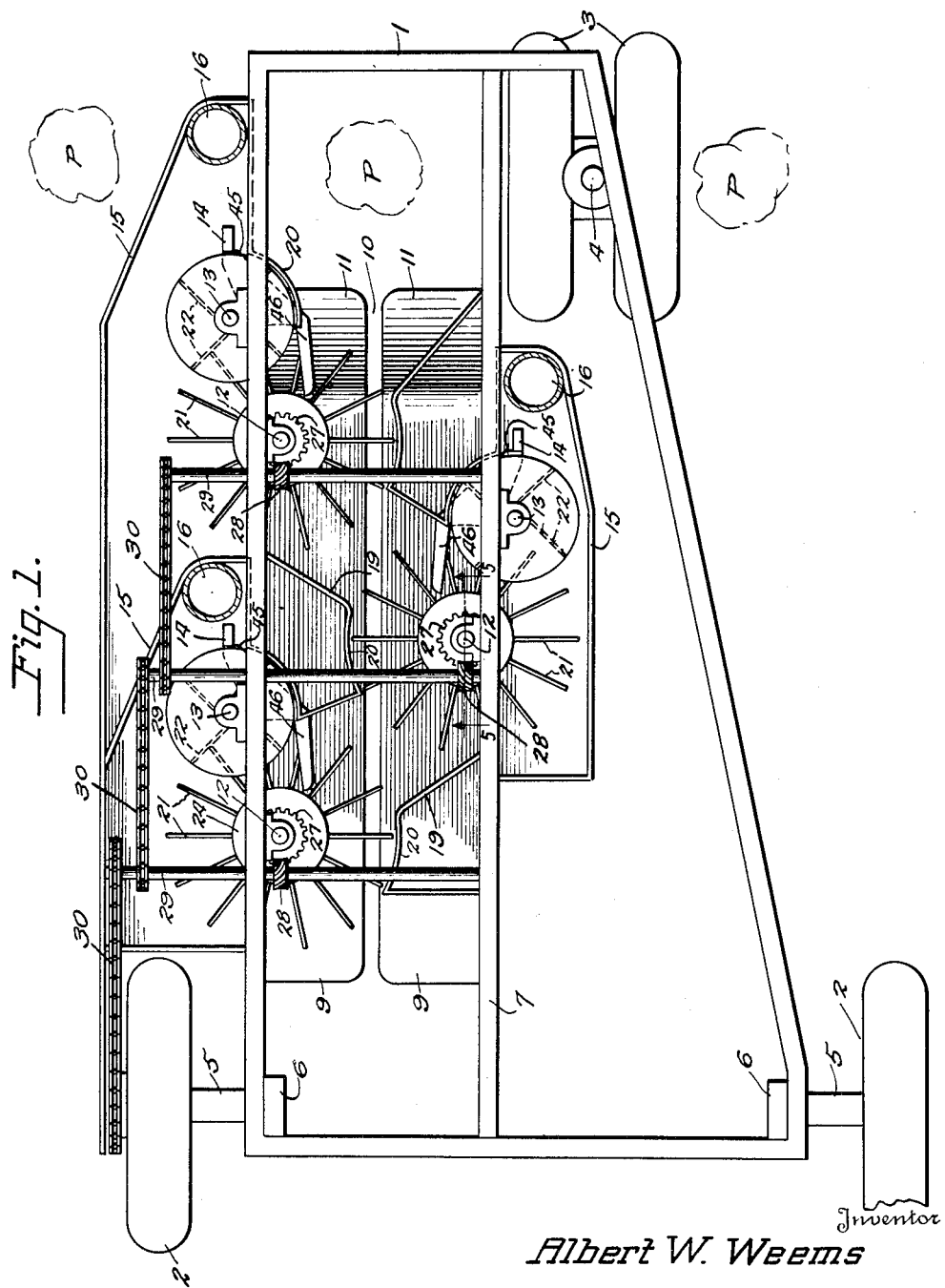

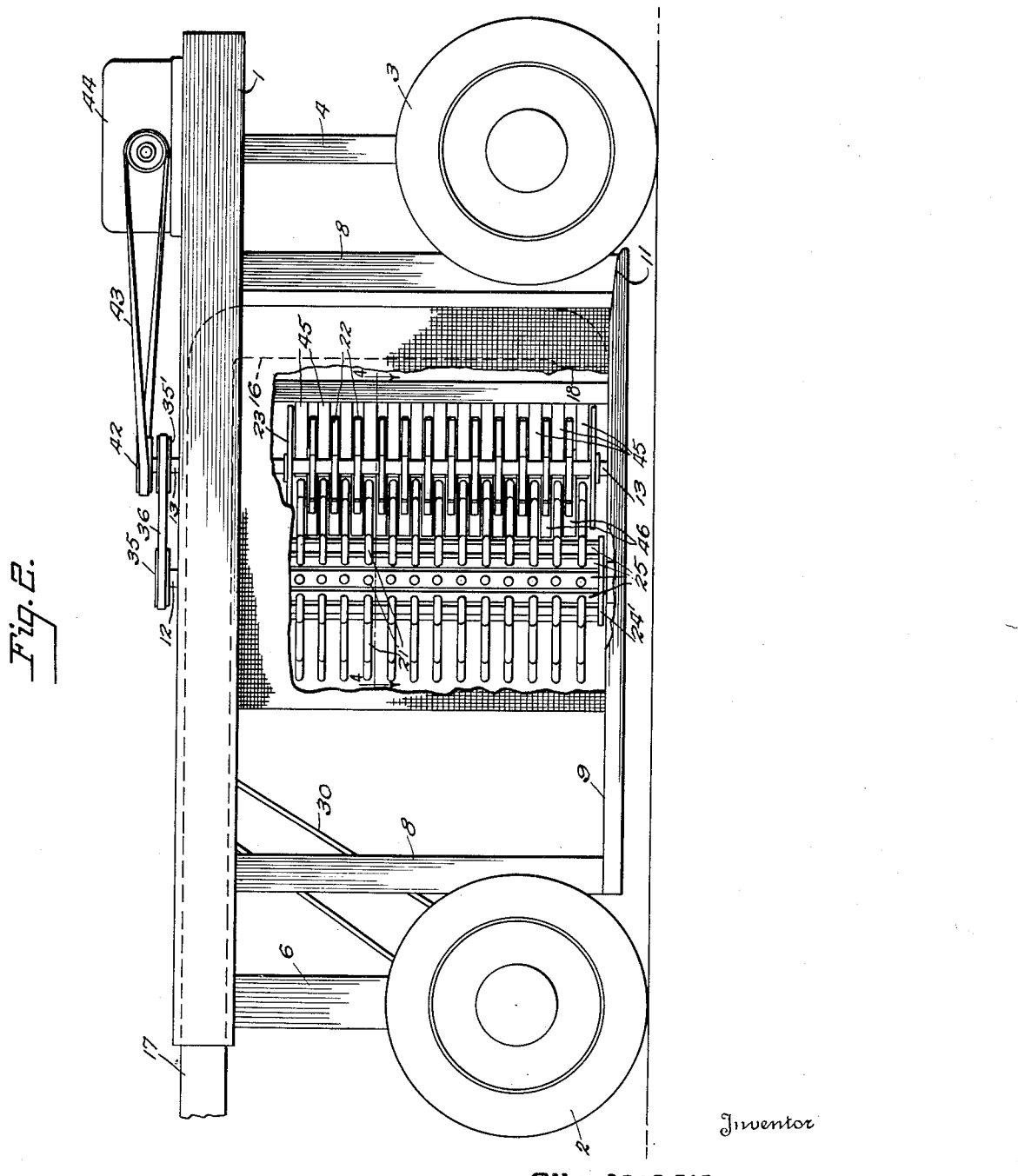

2,333,965

UNITED STATES PATENT OFFICE 2,333,965

MECHANICAL COTTON PICKER

Albert Williams Weems, Meridian, Miss.

Application July 6, 1942, Serial No. 449,932

13 Claims. (Cl. 56—44)

This invention relates to cotton pickers. The object of the invention is to provide an improved mechanical cotton picker capable of efficiently picking the cotton without injuring the cotton plants and thus permitting repeated pickings as the plants mature.

A further object of the invention is to provide an improved cotton picker which permits the picking of the cotton while the plants are damp as in the early morning hours with the removal of a large proportion of moisture and dirt from the picked cotton during the picking operation.

A further object of the invention is to provide an improved cotton picker with means for more efficiently removing the cotton from the picker spindles by air suction created by the picker spindles and stripper fingers.

A further object of the invention is to provide in a cotton picker improved means for supporting and driving the picker spindles whereby clogging of the spindle bearings with cotton is substantially eliminated and interruption of the machine caused by the bending or other accidental disturbance of particular picker spindles will not interfere with the normal operation of the machine and the other uninjured picker spindles.

Other objects will more particularly appear in the course of the following detailed description.

Three sheets of drawings accompany this specification as part thereof in which like reference characters indicate like parts throughout.

Figure 1 is a diagrammatic plan view of a cotton picker embodying the present invention;

Figure 2 is a side elevation partly in cross section of the improved machine;

Figure 3 is a fragmentary perspective showing the association of a portion of a bank of picker spindles, a bank of stripper fingers and associated baffle members;

Figure 4 is a fragmentary horizontal cross section through a bank of picker spindles, a bank of stripper fingers showing the baffle members in plan;

Figure 5 is a vertical fragmentary vertical cross section through a bank of picker spindles showing details of the mounting of the spindle frame on its supporting shaft and the drive mechanism for the picker spindles;

Figure 6 is a fragmentary vertical cross section through the bearing of a picker spindle; and Figure 7 is an end view of a picker spindle.

In accordance with the present invention the cotton picker will include a suitable frame herein illustrated as a substantially rectangular frame 1 supported at a distance above the ground by means of frame pedestal members 6 on the lower ends of which are secured stub shafts 5 upon which are mounted traction wheels 2 and forwardly positioned pedestal 4 on the lower end of which is pivotally mounted a pair of closely spaced steering and traction wheels 3. The frame and its associated supporting wheels 2 and 3 are so proportioned that in use the wheels 2 will straddle two rows of cotton while the guiding wheels 3—3 will be positioned in the middle between two rows of plants. The frame 1 may be further provided with a substantially medial longitudinally disposed frame member 7 spaced from an adjacent side portion of frame 1 a sufficient distance to bridge one row of cotton plants P as illustrated in Figure 1.

Frame members 8 depending from frame 1 and frame members 7 support on their lower ends horizontally disposed floor boards 9, the facing edges of which are spaced to provide a longitudinally disposed slot 10 through which the stems or stalks of the cotton plants in a row can pass as the entire machine is advanced. The forward ends 11 of the floor boards 9 are preferably slightly deflected so as to gently lift any downwardly inclined branches, it being desirable that all of the branches of the plants pass through the machine above the floor boards 9.

Suitably journalled between the floor boards 9 and the frame 1 are vertical shafts 12 for the picker spindle banks and these shafts are arranged in staggered relationship alternately on one side and then on the other of the slot 10 from front to rear. In the diagrammatic illustration of the machine in the drawings, three such shafts are provided, two over one floor board and one over the opposite floor board. Associated with but spaced from each of the shafts 12 are similar vertical shafts 13 carrying the stripper finger assemblies, there being one bank of stripper fingers for and associated with each bank of picker fingers. Each of the groups of associated shafts 12 and 13 are spaced apart so that the picker spindles and stripper fingers respectively will, in their rotation, have a common area of travel, this common area of travel being positioned forwardly of each bank of picker spindles and horizontal baffles 45—46 are arranged in vertically spaced relationship supported by vertical frame members 14 so that baffles 45 and 46 will cooperate as hereinafter more particularly described with the picker spindles and stripper fingers to completely mask the forward side of this common area of travel of the picker spindles and stripper fingers as is indicated in Figure 4.

Associated with each of the floor boards 9 are housings 15 of wire mesh providing an enclosing outer wall for each group of pickers and each such group is provided with a suction conduit 16 having a rearwardly directed opening 18 at its bottom adjacent the floor boards 9 and communicating at its top with a conduit 17 which will lead to any suitable depository for cotton carried by or associated with the machine, but not here shown. The framework further carries a plurality of guide baffles 19, associated with and oppositely disposed to each of the banks of picker spindles and associated with a rearwardly extended arcuate portion 20 concentric with the banks of picker spindles, these guide baffles 19 and 20 operating in cooperation with the floor boards 9 to guide the cotton plants so that the stems of the plants will, as previously indicated, pass through the slot 10 between the floor boards 9 while the branches of the plants will be successively inclined first to one side and then to the other into engagement with the picker spindles of the staggered banks of such picker spindles by means of which arrangement the plants will not be injured, but will be fully exposed on both sides to the operation of picker spindles in the course of their passage through the machine.

Turning now ot a more particular description of the picker spindles 21 and Figures 4 and 5, it will be noted that spaced disks 24, 24' are rotatably mounted on the shafts, these disks being connected in a reel-like structure by means of vertically positioned spaced frame members 25. Each of the frame member carries spaced bearings 31 for a group of picker spindles 21, each of which picker spindles being provided at its inner end with a journal portion adapted to extend through the tubular bearing 31 and carry on its inner end a bevelled roller 32 secured to the spindle as by cotter pin 40. A bushing 37 having on one end an outwardly directed peripheral flange 39 is interposed between the journal of spindle 21 and tubular bearing 31, this bushing 37 being of a length less than the tubular bearing 31 so that when the spindle roller and bushing are assembled and the spindle secured as by pin 38 bearing against the end of bushing 37, the bushing flange 39 will be secured between the roller 32 and tubular bearing 31 while the latter overhangs the spindle beyond bushing 37 so as to deflect cotton wrapped upon the spindle 21 from the bearing parts of the journal and bushing and thus prevent clogging of the spindle by the cotton. As herein illustrated the picker spindle is preferably cruciform in cross section, having one edge serrated as at 41.

Reverting to the reel disks 24, 24', disk 24' at the bottom of shaft 12 is provided with any suitable journal to rotate on that shaft while the upper disk 24 has a central orifice surrounded by an upwardly directed annular flange 26 within which is positioned a ring bearing 26' bevelled to retain bevelled rollers 50. A gear 27 freely mounted on shaft 12 and secured to the annular flange 26 is engaged by worm gear 28 secured to the horizontally disposed drive shaft 29. The drive shafts 29 are associated with each other and with a pulley carried by one of the rear traction wheels 2 by means of belts 30 so that as the machine is advanced all of the spindle reels will be rotated at the same speed and in suitable directions so that the picker spindles of each bank will pass over the slot 10 in the same front to rear direction as the machine advances and at a similar speed that the machine advances so that the picker spindles will contact the cotton plants and pass with the cotton plants as the latter progress through the machine without beating or breaking their branches.

To rotate the picker spindles 21 in each bank the disks 33 are fixedly secured to each of the shafts 12 in spaced relationship medially of successive paths of picker spindles and each of the disks 33 has a plurality of short lengths of V belt secured to its peripheral edge by one end only so that such belt portions are normally disposed tangential to such disks. Each of the shafts 12 has secured to its upper end a pulley 35 and the pulleys 35 are associated as by a belt 36 and all driven through a pulley 42 mounted on one of the shafts 12 and connected by a belt 43 with a suitable source of power 44 mounted on frame 1. In operation, the shaft 12 will be driven at a substantially higher rate of speed than the spindle reels 24 and the belt sections 34 will be engaged by centrifugal force between the adjacent bevelled pulleys 32 to rapidly rotate or spin the picker spindles 21 by a flexible frictional drive which will not be seriously interrupted even though particular picker spindles may become bent or otherwise inoperative.

Turning now to the stripper fingers 22 these are arranged in similar banks being attached to shafts 13 in horizontally positioned and vertically spaced tiers as is illustrated in Figures 3 and 4. The horizontal tiers of stripper fingers 22 are adapted to pass between the horizontal tiers of picker fingers 21 and to rotate in the opposite direction from that of the picker fingers. The stripper finger shafts 13 are provided at their upper ends with pulleys 35' which may be conveniently engaged by the belt 36 operating to drive the shafts 12.

Referring to Figures 3 and 4, it will be noted that the baffle members 45 are shaped and proportioned to substantially fill the spaces between the horizontal tiers of stripper fingers while the baffles 46 which may be conveniently attached to or formed integral with the baffles 45 are shaped and proportioned to substantially fill the spaces between the horizontal tiers of picker spindles 21, the combined baffles 45 and 46 being positioned to effectively seal the forward side of the common area of travel of the picker spindles and stripper fingers by reason of which construction the air currents set up by the stripper fingers will be prevented from blowing out into the center of the machine carrying particles of cotton out of the cotton channels. The stripper fingers 22 will in effect operate as pump vanes due to their rapid rotation and will set up air currents within this common area of travel directed against the picker spindles 21 and operating to effectively remove the cotton wound on such spindles in conjunction with the beating effect of the stripper fingers themselves. The rotation of the stripper fingers will also create a vacuum behind each finger which draws the cotton from the picker spindles. The cotton thus beaten and blown from the picker spindles will be directed against the outer wire mesh wall 15, the dust or moisture and dirt being effectively blown and thrown from such cotton through these screen walls so that the cleaned cotton will fall to the floor boards 9 and thence drawn by the suction draft through conduits 16 and 17 to the point of deposit.

Various modifications of the particular structure will readily suggest themselves to those skilled in the art but within the scope of the invention as claimed.

What I claim is:

1. In a cotton picker having a bank of picker spindles arranged to revolve in horizontal vertically spaced tiers and a bank of stripper fingers similarly arranged to revolve in horizontal vertically spaced tiers, the tiers of stripper fingers positioned to pass through the spaces between adjacent tiers of picker spindles with means co-operating with the picker spindles and stripper fingers to produce air currents and vacuum to remove the cotton from the picker spindles.

2. In a cotton picker having a bank of picker spindles arranged to revolve in horizontal vertically spaced tiers and a bank of stripper fingers similarly arranged to revolve in horizontal vertically spaced tiers, the tiers of stripper fingers positioned to pass through the spaces between adjacent tiers of picker spindles with baffle means co-operating with the picker spindles and stripper fingers to produce air currents directed against the picker spindles to remove the cotton.

3. In a cotton picker having a bank of picker spindles arranged to revolve in horizontal vertically spaced tiers and a bank of stripper fingers similarly arranged to revolve in horizontal vertically spaced tiers, the tiers of stripper fingers positioned to pass through the spaces between adjacent tiers of picker spindles with baffle means shaped and proportioned to fill the spaces between adjacent tiers of picker spindles and stripper fingers respectively cooperating with the picker spindles and stripper fingers to produce air currents and vacuum directed against the picker spindles to remove the cotton and prevent cotton particles from being blown back into the center of the machine.

4. In a cotton picker having a bank of picker spindles arranged to revolve in horizontal vertically spaced tiers and a bank of stripper fingers similarly arranged to revolve in horizontal vertically spaced tiers, the tiers of stripper fingers positioned to pass through the spaces between adjacent tiers of picker spindles with horizontally disposed vertically spaced baffles shaped and proportioned to substantially fill the spaces between the tiers of picker spindles and tiers of stripper fingers in advance of the area of travel common to said fingers and spindles.

5. In a cotton picker a wheel-supported frame with spaced parallel floor members suspended therefrom defining a longitudinally extending guide slot for the plant stems, a plurality of revolving banks of picker spindles arranged alternately in staggered relation over said floor members from front to rear with the picker spindles extending across the slot.

6. In a cotton picker a wheel-supported frame with spaced parallel floor members suspended therefrom defining a longitudinally extending guide slot for the plant stems, a plurality of revolving banks of picker spindles arranged alternately in staggered relation over said floor members from front to rear with the spindles bridging the slot, with guide means associated with each of said banks of picking spindles over the portion of the other floor member laterally disposed to that bank to direct the plant into the path of the picker spindles of that bank as they pass over the slot.

7. In a cotton picker a wheel-supported frame with spaced parallel floor members suspended therefrom defining a longitudinally extending guide slot for the plant stems, a plurality of revolving banks of picker spindles arranged alternately in staggered relation over said floor members from front to rear with the spindles bridging the slot, with guide means associated with each of said banks of picking spindles over the portion of the other floor member laterally disposed to that bank to direct the plant into the path of the picker spindles of that bank as they pass over the slot, with similarly staggered revolving banks of stripper fingers, one associated with each bank of picker spindles.

8. In a cotton picker a wheel-supported frame with spaced parallel floor members suspended therefrom defining a longitudinally extending guide slot for the plant stems, a plurality of revolving banks of picker spindles arranged alternately in staggered relation over said floor members from front to rear, with guide means associated with each of said banks of picking spindles over the portion of the other floor member laterally disposed to that bank to direct the plant into the path of the picker spindles of that bank as they pass over the slot, with similarly staggered revolving banks of stripper fingers, one associated with each bank of picker spindles, with baffles positioned to co-operate with each associated bank of picker spindles and stripper fingers to produce air currents and vacuum directed to remove cotton from the picker spindles and prevent cotton particles from being blown back into the center of the machine.

9. In a cotton picker a wheel-supported frame with a plurality of revolvable banks of rotary picker spindles positioned alternately on opposite sides of and bridging a front to rear guide slot for the plant stems passing through the frame, the rotary picker spindles in each bank arranged in vertically spaced horizontal tiers, a plurality of revolvable banks of stripper fingers one associated with each bank of picker spindles, the stripper fingers of each bank being arranged in vertically spaced horizontal tiers, the horizontal tiers of picker spindles and stripper fingers of associated banks being arranged with a common area of travel during which the stripper fingers pass through the spaces between adjacent tiers of picker spindles, with horizontally disposed baffles positioned forwardly of said common area of travel and shaped and proportioned to substantially fill all of the spaces between the tiers of both the picker spindles and stripper fingers, means for revolving the banks of picker spindles proportionately with the advance of the frame over the ground, means for rotating the picker spindles, means for rotating the banks of stripper fingers and means for removing cotton to a place of deposit.

10. In a cotton picker a revolvable bank of rotary picker spindles comprising a reel-like frame rotatable on a vertical shaft with the rotary spindles mounted in bearings carried by peripherally disposed vertical frame members, each spindle having on its inner end a bevelled pulley, a plurality of disks fixed to the shaft within the frame each disk having a plurality of flexible V-belt strips secured to its peripheral edge by one end only, said strips of a length to contact and drive the bevelled pulleys of the spindles when the shaft is rotated, means for rotating the bank of spindles on the shaft and means for rotating the shaft.

11. In a cotton picker a revolvable bank of rotary picker spindles comprising a shaft, a reel-like frame rotatable on the shaft and including a plurality of frame members spaced from but parallel with the shaft, spaced bearings on each of said frame members, picker spindles journalled in said bearings, bevelled pulleys one fixed on the inner end of each spindle within the frame, a plurality of disks fixed on the shaft spaced intermediate adjacent spindle pulleys, each disk having secured to its peripheral edge a plurality of pieces of V-belt each fastened by one end only and of a length to contact and drive said adjacent spindle pulleys when actuated by centrifugal force, means for rotating the spindle frame on the shaft and means for rotating the shaft at a substantially greater speed.

12. In a cotton picker, a picker spindle having a journal adjacent one end, a flanged bushing for said journal and a tubular bearing adapted to receive the bushing, said tubular bearing being of greater length than the bushing.

13. In a cotton picker, a picker spindle, a pulley on one end of the spindle, a journal portion on the spindle adjacent the pulley, a flanged bushing for the journal and a tubular bearing of greater length than the bushing with means securing the bushing on the spindle with its flange between the pulley and the end of the tubular bearings.

ALBERT WILLIAMS WEEMS.